July 8, 1924.

H. HEUSER

ART OF DEALCOHOLIZING LIQUIDS

Filed June 1, 1920

Inventor:
Herman Heuser,
By Dyrenforth, Lee, Chritton & Wiles,
Attys

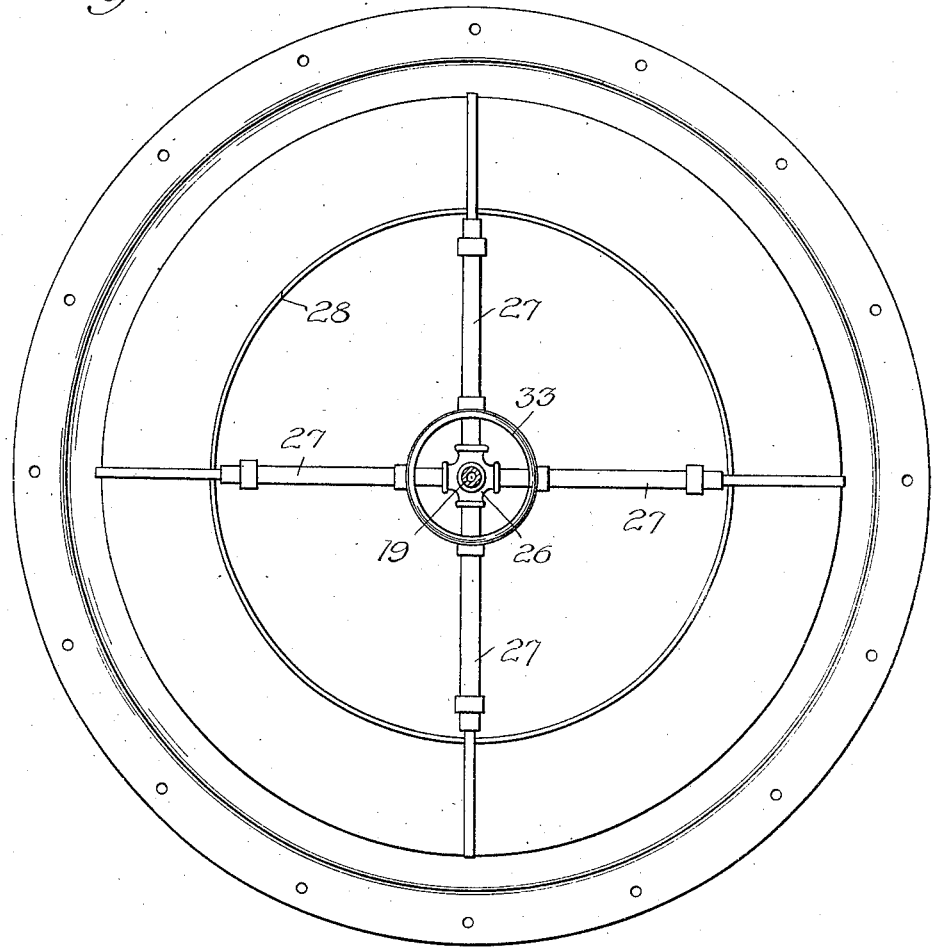

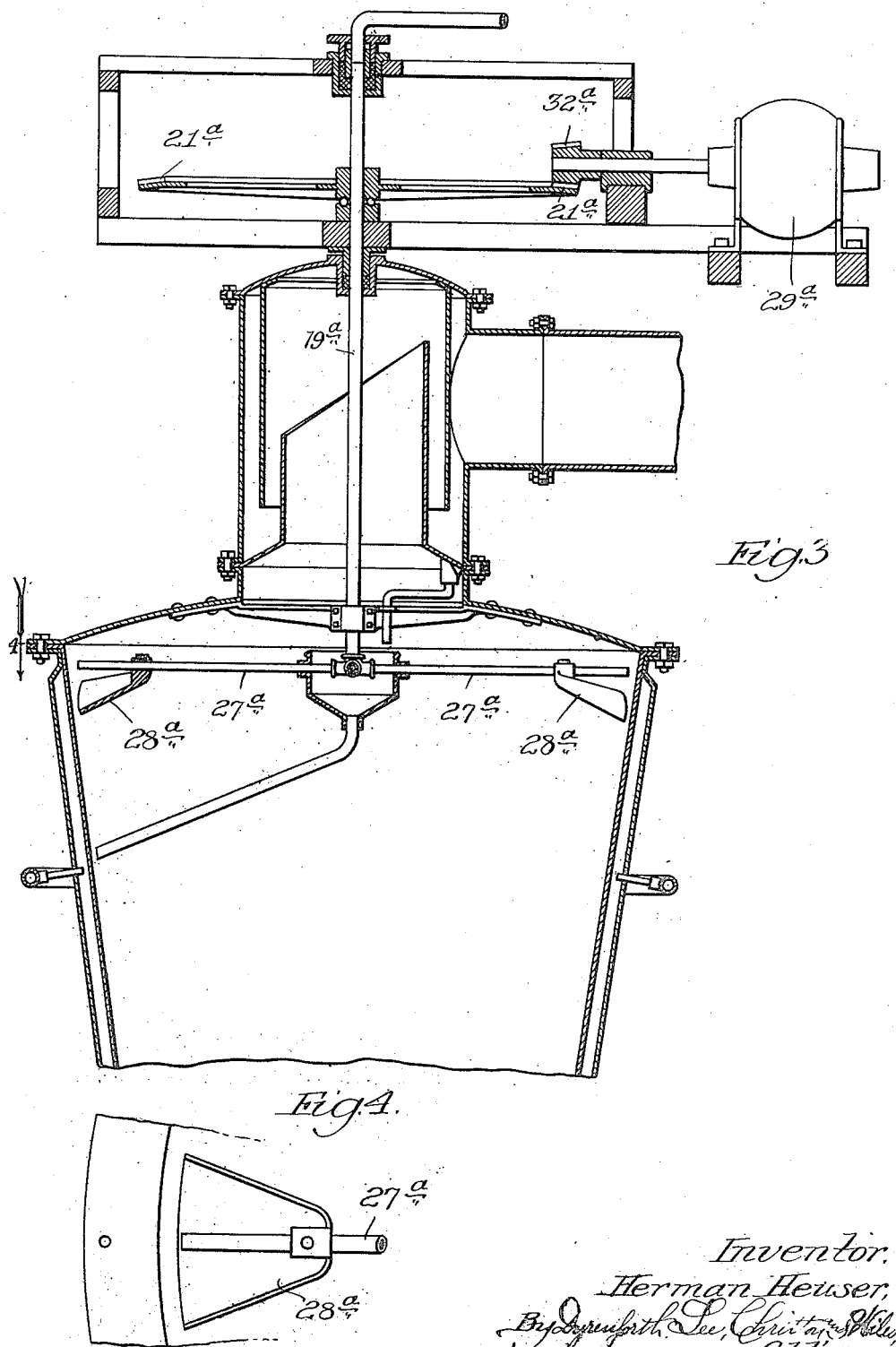

Patented July 8, 1924.

1,500,618

UNITED STATES PATENT OFFICE.

HERMAN HEUSER, OF EVANSTON, ILLINOIS.

ART OF DEALCOHOLIZING LIQUIDS.

Application filed June 1, 1920. Serial No. 385,701.

*To all whom it may concern:*

Be it known that I, HERMAN HEUSER, a citizen of the United States, residing at Evanston, in the county of Cook and State of Illinois, have invented a new and useful Improvement in the Art of Dealcoholizing Liquids, of which the following is a specification.

The present invention relates to the removal of alcohol from liquids, and more particularly from liquids, such as beers, ales, wines, fermented fruit juices, which contain dissolved gas and which tend to foam on boiling or when subjected to a vacuum. It will be fully understood from the following description thereof, illustrated by the accompanying drawings, in which—

Fig. 2 is a transverse sectional view on line 2—2 of Fig. 1.

Fig. 3 is a vertical sectional view partially broken away through a modified form of dealcoholizing apparatus; and Fig. 4 is a transverse sectional view on line 4—4 of Fig. 3.

Figure 1:
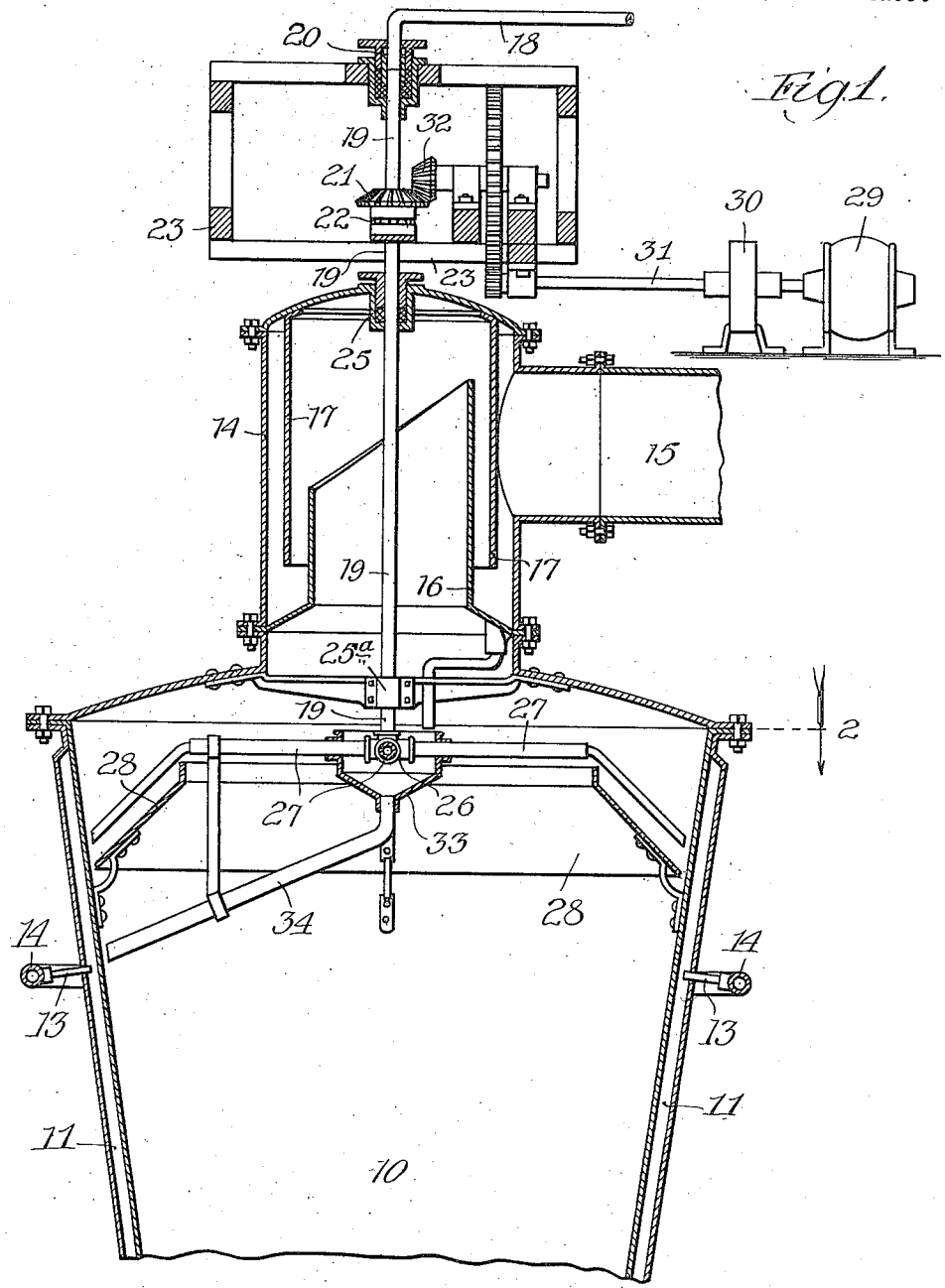
Fig. 1 is a vertical sectional view, partially broken away of a dealcoholizing apparatus constructed in accordance with the present invention.

In my prior Patents Nos. 1,277,931 of September 3, 1918 and 1,286,315 of December 3, 1918, I have described methods and apparatus for dealcoholizing liquids, particularly of the gas containing and froth-forming type, in which the liquid to be treated was distributed in the form of a thin film over a surface upon which it flowed, likewise in a thin film, while being subjected to the heating effect due to the latent heat of vaporization of steam. In the accompanying drawings (see Figs. 3 and 4) the numeral 10 indicates a dealcoholizing pan or evaporator of the type shown in my prior patents above mentioned, and having a form substantially that of an inverted truncated cone of circular section the lower portion, from which a continuous discharge takes place, being broken away. The pan is jacketed, and steam is admitted into the jacket 11 at spaced intervals in horizontal zones, as through manifolds 12 and spray distributors 13 by which the steam is distributed over the outer surface of the inner wall of the pan 10 in very flat sprays.

The pan is surmounted by a vapor dome 14, which communicates with vapor line 15, leading to a heat exchanger in which the beer or other liquid is preheated as illustrated in my prior patents, and to suitable condensing apparatus (not shown). Suitable baffles 16, 17 are provided to prevent the entrainment of liquid by vapors passing into the vapor line 15.

The beer or other liquid to be dealcoholized, and which may be preheated, if desired, for example by heat exchange with the vapors issuing from the pan, as shown in my prior patents hereinbefore referred to, is supplied through pipe 18, which communicates with the rotatable admission pipe 19 by means of a suitable packed union 20. The pipe 19 is rotated by means of bevel gear 21, keyed thereto, the gear 21 being mounted on a ball bearing thrust 22 on a suitable support 23, and the pipe 19 is likewise journalled, in a packed bearing 25 through which it enters the vapor dome 14 and passes into the pan and in bearing 25$^a$ within the pan. At its lower end the pipe 19 is threaded into the hollow box 26, which is provided with a plurality of openings to which are connected the horizontal radial distributing arms or pipes 27. These pipes are spaced from each other by equal arcs, there being, in the apparatus illustrated, four such pipes at right angles to each other. In order to accomplish the results hereinafter pointed out, at least three such pipes should be provided. These pipes terminate near the walls of the pan and are provided at their outer ends with small openings through which the beer is directed against the inner wall of the pan. An inclined annular shield 28 is mounted upon the inner wall of the pan just below the level of the distributing arms, being spaced away from the walls of the pan by a small gap, say ½ to 1 inch, permitting the free flow of a thin film of fluid down the walls of the pan and preventing particles of liquid from descending within the pan away from the walls thereof. Rotation of pipe 19 is effected by motor 29 through suitable speed reducer 30, shaft 31 and gear 32.

In operation the beer admission pipe is rotated at a relatively slow rate of speed; say, 40–50 times per minute. The beer flows through the rotating pipe 19 and the radial pipes 27, and is ejected from the latter against the walls of the pan without a material amount of splashing. As the ejecting force at each of the outlets for the liquid within the pan (including both head and centrifugal force) is the same, its distribution is uniform whether the liquid is supplied at full or partial capacity. The relatively slow rotation of the distributing arms in the construction in accordance with the present invention likewise eliminates almost entirely splashing due to violence of impact of the liquid with the walls of the pan while permitting the feeding of a continuous film of liquid over the entire surface of the pan.

Condensed liquid which forms in the dome and that which forms upon the pipe 19 and box 26 drips into the circular dished pan 33 fixed to the latter, from which it drains through downwardly inclined radially directed pipe 34 to near the wall of the pan, against which it is ejected to be added to the flowing film of liquid thereon.

In the modified form of construction shown in Figs. 3 and 4 a shield 28 having a conical form and extending to within a short distance from the inner walls of the pan is secured each of the distributing arms 27ª which are of similar form of construction to the distributing arms of the form of construction of Figs. 1 and 2. In the construction shown in these figures the motor 29ª is geared directly to the rotatable admission pipe 19ª by speed reducing gears 21ª and 32ª.

The apparatus may be operated under atmospheric pressure, or, if desired, under partial vacuum, or at pressure above atmospheric.

Although the present invention has been described in connection with the details of certain forms of construction, it is not intended that these details shall be regarded as limitations upon the scope of the invention except in so far as included in the scope of the accompanying claims.

I claim:

1. In evaporating apparatus, a vertical pan of circular section, a rotatable liquid supply pipe depending centrally thereinto and terminating near its top, radial distributing arms secured to the admission pipe near its end and communicating therewith, said pipes terminating adjacent the wall of the pan and discharging upon its inner surface, means for rotating the admission pipe with the attached distributing pipes to distribute liquid uniformly in a continuous flowing film over the wall of the pan, and shielding means disposed below the ends of the distributing pipes and spaced from the wall of the pan to permit passage of the film of liquid thereon.

2. In apparatus for dealcoholizing a liquid, a vertical, externally heated pan of inverted conical form having a circular section, a liquid admission pipe passing into said pan and terminating centrally thereof near its top, four radially directed distributing pipes secured to the admission pipe near its end and communicating therewith, said pipes being at right angles and of equal length and terminating adjacent the wall of the pan, means for rotating the admission pipe with the attached distributing pipes to distribute liquid uniformly in a continuous flowing film over the wall of the pan, and an annular shield within the pan below the distributing pipes, said shield having its edge spaced from the wall of the pan to permit passage of the film of liquid thereon.

3. In apparatus for dealcoholizing liquids, a vertical pan of circular section, a rotatable liquid supply pipe depending centrally thereinto, and terminating near its top, radial distributing arms secured to the end of the supply pipe and communicating therewith, said pipes terminating nearer the wall of the pan to distribute liquid thereupon, a pan secured to the supply pipe directly below its end to receive liquid condensed on the supply pipe; and a radially directed pipe communicating with said pan and terminating near the wall of the pan to distribute thereover condensed liquid collected in the pan.

HERMAN HEUSER.